United States Patent [19]
Ishida et al.

[11] Patent Number: 5,860,057
[45] Date of Patent: Jan. 12, 1999

[54] SATELLITE COMMUNICATIONS SYSTEM AND METHOD

[75] Inventors: Noriaki Ishida, Yokosuka; Toyoaki Uchida, Ebina, both of Japan

[73] Assignee: Hitachi, Ltd., Tokyo, Japan

[21] Appl. No.: 614,536

[22] Filed: Mar. 13, 1996

[30] Foreign Application Priority Data

Mar. 15, 1995 [JP] Japan .................................... 7-055830

[51] Int. Cl.$^6$ ...................................................... H04B 7/18
[52] U.S. Cl. ........................ 455/12.1; 370/317; 455/303
[58] Field of Search ................... 455/12.1–13.4, 455/303–307, 296, 84, 65; 370/316–326; 342/352–358

[56] References Cited

U.S. PATENT DOCUMENTS

| | | | |
|---|---|---|---|
| 3,596,002 | 7/1971 | Ohnsorge et al. | 370/320 |
| 3,963,990 | 6/1976 | DiFonzo | 455/304 |
| 5,235,612 | 8/1993 | Stilwell et al. | 370/317 X |
| 5,428,600 | 6/1995 | Potier | 370/316 X |
| 5,444,864 | 8/1995 | Smith | 455/84 |
| 5,625,640 | 4/1997 | Palmer et al. | 370/316 X |

FOREIGN PATENT DOCUMENTS

| | | | |
|---|---|---|---|
| 103433 | 6/1984 | Japan . | |
| 1932 | 1/1985 | Japan . | |
| 202533 | 9/1986 | Japan . | |
| 356824 | 12/1992 | Japan | 455/307 |

OTHER PUBLICATIONS

Feher, Dr. Kamilo, Single–Channel–Per–Carrier (SCPC) Preassigned and Demand–Assigned, Spade, Digital Satellite Earth Stations, *Digital Communications, Satellite/Earth Station Engineering*, 1981, Chapter 10, pp. 422–439.

Satellite Communications Handbook, *International Telecommunication Union*, Geneva, 1988, pp. 128–139; pp. 332–335.

VSAT Systems and Earth Stations, Handbook on Satellite Communications, *International Telecommunication Union*, Supplement No. 3, pp. 4–13.

Bhargava, Vijay K. et al., Digital Communications by Satellite, 1981, pp. 18–23; pp. 436–439.

*Primary Examiner*—Thomas J. Mullen, Jr.
*Attorney, Agent, or Firm*—Frohwitter

[57] ABSTRACT

A satellite communications system and method capable of bidirectional satellite communications between earth stations via a satellite, whereby communications by a plurality of signals sharing the same frequency band become possible while partially or wholly superposing respective signal frequencies. Each earth station including: a transmission circuit for transmitting a local transmission signal toward the satellite; a reception circuit for receiving a remote transmission signal transmitted from a remote earth station and a return signal, the return signal being part of the local transmission signal transmitted from the local earth station toward the satellite and partially returned from the satellite and received at the local earth station; and a cancelling circuit being supplied with part of the local transmission signal and the received return signal, for cancelling the received return signal by part of the local transmission signal.

35 Claims, 7 Drawing Sheets

OCCUPIED BANDWIDTH = MAX $\{BW_{(A \to B)}, BW_{(B \to A)}\}$

OCCUPIED BANDWIDTH = $BW_{(1 \to 2)} + BW_{(2 \to 1)} + BW_{(1 \to 3)} + BW_{(3 \to 1)} + \cdots$
$+ BW_{(2 \to 3)} + BW_{(3 \to 2)} + \cdots$ (1) FREQUENCY DIVISION USE →f (2) TIME DIVISION USE →t OCCUPIED BANDWIDTH $= \text{MAX}\{BW_{(1 \to 2)}, BW_{(2 \to 1)}\}$ $+ \text{MAX}\{BW_{(1 \to 3)}, BW_{(3 \to 1)}\} + \cdots$ $+ \text{MAX}\{BW_{(2 \to 3)}, BW_{(3 \to 2)}\} + \cdots$ OCCUPIED BANDWIDTH = $BW_{(A \to B)} + BW_{(B \to A)}$ (1) FREQUENCY DIVISION USE (2) TIME DIVISION USE

SATELLITE COMMUNICATIONS SYSTEM AND METHOD

BACKGROUND OF THE INVENTION

1. Field of the Invention

The present invention relates to a satellite communications system and method capable of efficiently using a frequency band of satellite communications.

2. Description of the Related Art

In satellite communications, a usable frequency band of a transponder is limited and a transponder user is incurred with a charge proportional to the frequency bandwidth. An efficient use of a frequency band is therefore necessary. To this end, it has been proposed to use the same frequency band by a plurality of signals.

If different satellites are used, two signals of the same frequency band can be divided by utilizing the directivity of an antenna at each earth station. Even if the same satellite is used, two signals of orthogonally polarized vertical and horizontal waves can be discriminated by an orthogonal polarization band splitter.

However, two signals of the same polarization from the same satellite cannot be separated, posing a problem that both the signals cannot be received.

As above, in a conventional satellite communications system, the same frequency band cannot be shared for the transmission of two signals of the same polarization via the same satellite.

An example of the prior art satellite communications system is illustrated in FIG. 12.

This example shows bidirectional communications between two stations A and B (earth stations). Two signals are transmitted, one signal $S_A$ (A→B) being transmitted from station A to station B and the other signal $S_B$ (B→A) being transmitted from station B to station A. If the bands of two signals are superposed, both the signals cannot be received. Frequency division multiple access (FDMA) and time division multiple access (TDMA) have been used as a means for avoiding signal superposition.

In FDMA as shown in FIG. 12 at (1), two stations A and B transmit signals $S_A$ and $S_B$ at different frequency bands in order to avoid signal superposition and allow bidirectional communications. It is therefore necessary to occupy the bandwidth (BW(A→B)+(BW(B→A) which is a sum of the bandwidth BW(A→B) required for signal transmission from station A to station B and the bandwidth BW(B→A) required for signal transmission from station B to station A.

In TDMA as shown in FIG. 12 at (2), two stations A and B transmit signals $S_A$ and $S_B$ in a burst form at predetermined timings in such a synchronous manner that two signals are not superposed in the time domain at the transponder of a satellite. The transmission is controlled so that while the signal from station A is reaching the satellite, the signal from station B is not reaching the satellite, and vice versa. Since each station transmits a signal in a batch manner in a limited time, the necessary bandwidth increases. It is therefore necessary to occupy the bandwidth BW(A→B)+BW(B→A) which is a sum of the bandwidth BW(A→B) required for transmission of the signal $S_A$ from station A to station B and the bandwidth BW(B→A) required for transmission of the signal $S_B$, from station B to station A. Complicated synchronizing equipments are also required.

Code division multiple access (CDMA) is also known. In CDMA, a signal to be transmitted is dispersed by using a high speed code and it is not desirable from the viewpoint of efficient frequency usage.

Conventional technology called interference compensation is known which is used as a means for correctly dividing separating a reception signal (desired wave) from a reception obstacle signal (interference signal) superposed upon the reception signal.

This technology is adopted to eliminate a reception failure in satellite communications to be caused by superposed waves in a satellite system and a terrestrial system. This technology basically relies upon an auxiliary antenna which has such a directivity that only waves of the terrestrial system can receive. Specifically, if waves (interference waves) of the terrestrial system superpose upon reception waves (desired wave) of the satellite system because of the side lobe characteristics of a satellite wave reception antenna (main antenna), another auxiliary antenna receiving only interference waves of the terrestrial system is used for cancelling the interference wave components contained in the reception waves of the main antenna.

A conventional earth station in satellite communications is not provided with a function of cancelling a local transmission signal (satellite return signal) contained in its reception signal. Therefore, a plurality of signals superposed one upon another cannot be used on the same frequency band.

Consider now that the same frequency band is made usable (band sharing) in bidirectional communications between stations A and B and the necessary bandwidth is halved at a maximum. In this case, as illustrated in FIG. 1 showing the concepts of the invention, a local transmission signal (satellite return signal) of stations A and B (earth stations) becomes an interference signal hindering normal reception, as different from conventional technologies. This interference signal comes from the same satellite as the desired wave so that it is not possible to receive only the interference signal by utilizing the antenna directivity. In conventional satellite communications, each station has no function of removing such an interference signal.

SUMMARY OF THE INVENTION

It is one object of the present invention to provide a satellite communications system and method capable of efficiently using or band sharing limited frequency resources.

It is another object of the present invention to provide a satellite communications system and method capable of cancelling local transmission signal components or satellite return signal contained in its reception signal and providing good satellite communications, when the frequency band is to be efficiently used by positively incorporating interference.

Although a frequency band is intended to be used efficiently through incorporation of interference, only a local transmission signal ($S_A$ or $S_B$) cannot be separated from its reception signal by utilizing the antenna directivity characteristics and spatial diversity, as different from interference of a terrestrial wave which can be cancelled by conventional interference compensation technology. According to one aspect of the present invention, there are provided means for generating a signal same as the local transmission signal contained in its reception signal and means for cancelling the local transmission signal contained in its reception signal by controlling the amplitude and phase of the generated signal.

According to another aspect of the present invention, there is provided means for controlling a delay time of the signal for cancelling the local transmission signal or satellite return signal so as to compensate for a variation of a transmission delay time of the local transmission signal caused by drifts of a satellite.

Since two signals of the same frequency band are allowed to be received at the same time by a satellite transponder, a limited power of the transponder is required to lower by 3 dB at the maximum in some cases.

In such cases, according to another aspect of the present invention, since each earth station has its local transmission information, each local station generates a signal same as the local transmission signal components contained in its reception signal, and adds the generated signal having the same amplitude as, and the opposite phase to, those of the local transmission signal components to the reception signal to cancel or offset the local transmission signal components. In this manner, a signal of the same frequency band transmitted from a remote station can be correctly received.

DETAILED DESCRIPTION OF THE PREFERRED EMBODIMENTS

Figure 1:
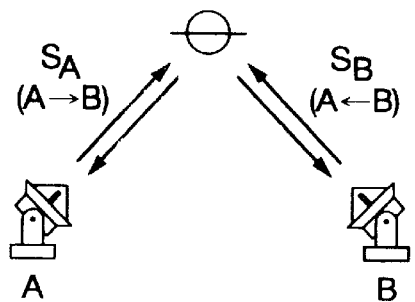
FIG. 1 illustrates the concepts of the present invention.
Figure 1:
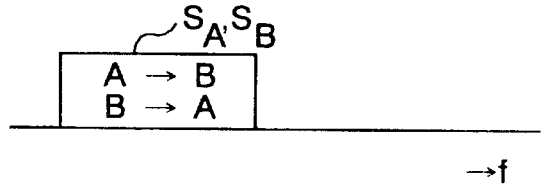
Figure 2:
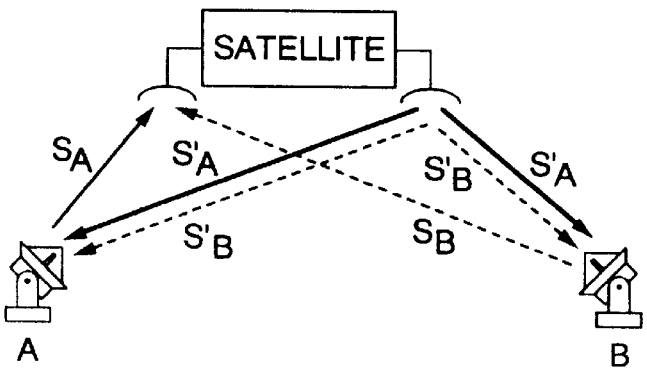
FIG. 2 is a diagram illustrating the operation of an embodiment of the present invention.

FIGS. 2 to 5 are diagrams used for describing the concepts of the present invention. FIG. 2 shows an example of bidirectional communications between two stations. Referring to FIG. 2, both earth stations A and B receive a superposed signal of $S'_A$ and $S'_B$ from the satellite. Earth station A has a signal $S_A$ and cancels the satellite return signal $S'_A$ by using the signal $S_A$ to obtain a signal $S'_B$ transmitted from earth station B via the satellite. Earth station B has a signal $S_B$ and cancels the satellite return signal $S'_B$ by using the signal $S_B$ to obtain a signal $S'_A$ transmitted from earth station A via the satellite.

The principle of cancelling a local transmission signal (satellite return signal) will be described using some equations.

The signal ($S'_A + S'_B$) received from the satellite is added by an adder to a signal ($S'_A$ or $S'_B$) for cancelling a local transmission signal contained in the received signal ($S'_A$ + $S'_B$). Signals at input and output ports of the adder are given by the following equations.

The signal ($S'_A + S'_B$) received from the satellite is given by $S(t)$ of the following equation (1):

$$S(t)=S_1(t-t_0)\exp[j\{\omega_1(t-t_0)+\theta_1\}]+S_2(t-t_2)\exp[j\{\omega_2(t-t_2)+\theta_2\}] \quad (1)$$

where $t_0$ is a time required for a radio wave to reach the satellite and return to earth station A or B.

The signal for cancelling a local transmission signal is given by $S_S(t)$ of the following equation (2):

$$S_S(t)=a_0S_1(t-t_D)\exp[j\{\omega_1(t-t_D)+\theta_S+\pi\}]=-a_0S_1(t-t_D)\exp[j\{\omega_1(t-t_D)+\theta_S\}] \quad (2)$$

where $t_D$ is a delay time at a delay circuit.

Substituting $\Delta\tau$ for a term ($t_0-t_D$) and $\tau$ for a term ($t-t_0$), an output signal $S_T$ of the adder is given by the equation (3):

$$\begin{aligned}S_T(t) &= S(t)+S_S(t) \\ &= \{S_1(\tau)-a_0S_1(\tau+\Delta\tau)\exp[j\{\omega_1\Delta\tau+\theta_S-\theta_1\}]\}\exp[j(\omega_1\tau+\theta_1)]+S_2(\tau-\tau_2')\exp[j\omega_2(\tau-\tau_2')+\theta_2\end{aligned} \quad (3)$$

where $\tau_2'=t_2-t_0$.

If $\Delta\tau \approx 0$, then the equation (3) is rewritten by the equation (4):

$$S_T(t)=S_1(\tau)(1-a_0\cos(\theta_S-\theta_1)-ja_0\sin(\theta_S-\theta_1))\exp[j\{\omega_1\tau+\theta_1\}]+S_2(\tau-\tau_2')\exp[j\omega_2(\tau-\tau_2')+\omega_2 \quad (4)$$

If the amplitude and phase of the signal for cancelling the local transmission signal are adjusted to satisfy the conditions of $a_0=1$ and $\theta_S=\theta_1$ the output of the adder is given by the equation (5):

$$S_T(t)=S_2(\tau-\tau_2')\exp[j\omega_2(\tau-\tau_2')+\theta_2 \quad (5)$$

As seen from the equation (5), only the remote transmission signal $S_2$ ($S'_A$ or $S'_B$) can be received.

In this cancellation, it is important to satisfy the condition of $\Delta\tau \approx 0$ and compensate for a variation of a delay time caused by the position change of the satellite.

There is a time delay of satellite return propagation between a signal transmitted from a satellite earth station and local transmission signal components contained in a signal received from the satellite. Therefore, in order to cancel the local transmission signal components in a reception signal, a storage means for delaying (storing) local transmission signal information by a time (about 0.24 sec) required for satellite return propagation is provided. This can be achieved by storing baseband data before modulation, in a buffer (memory). The delay time varies with drifts of the satellite. This variation can be compensated by controlling the timing when the data in the memory is read. By using this baseband data stored in the buffer (memory), a modulated wave is generated. The amplitude and phase of the modulated wave are adjusted to have the same amplitude as, and the opposite phase to, those of the local transmission signal components contained in the reception signal, and are added to the reception signal. In this manner, the local transmission signal components contained in the reception signal can be cancelled and a desired signal can be correctly received. The signal received from the satellite is subjected to a frequency change of the local oscillator at the satellite transponder. In order to compensate for the frequency change of the local oscillator at the satellite transponder, a carrier is reproduced from the reception signal and used for generating the modulated wave for cancelling the local transmission signal. For the reproduction of a carrier, it is effective to set the carrier frequencies of stations A and B slightly different.

In order to adjust the delay time, it can be considered to use the format of the local transmission signal. For example, the transmission signal is made in the form of frame and a frame marker indicating the position of the frame is affixed. It is also possible to adjust the delay time through synchronization between a received and divided clock and a clock (delay data read timing) for generating the modulated wave for cancelling the local transmission signal.

A suppression factor of local transmission signal components can be improved by equalizing distortions caused by limited bandwidth and delay of the satellite return path (satellite transponder, local transmission\reception RF filter, and so on).

If the amounts of information of two-site bidirectional communications are the same, complete band sharing is possible and the bandwidth can be halved as compared to conventional communications.

If the amounts of information of two-site bidirectional communications are different, a broader bandwidth is reserved to allow band sharing communications. As different from conventional communications, the narrower bandwidth is not necessary so that the band can be used efficiently.

Also in multi-site communications, band sharing is possible by assigning one band with each two-site communications group because multi-site communications can be basically regarded as two-site communications through broadcast communications.

Figure 3:
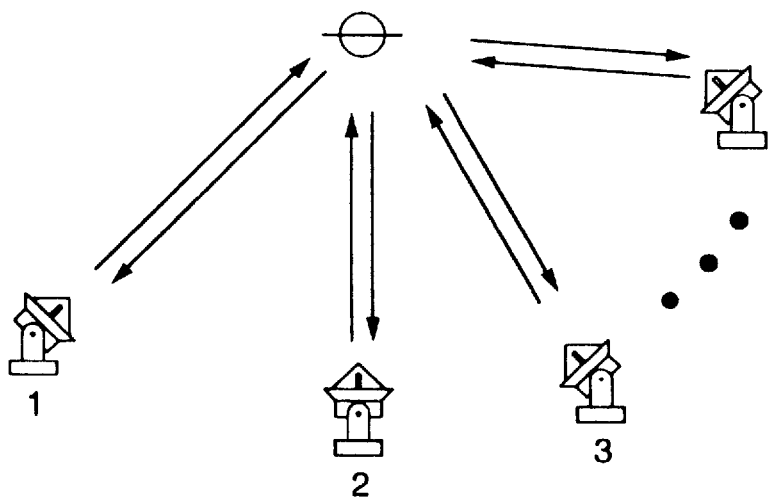
FIG. 3 is a diagram illustrating conventional multi-site communications.
Figure 3:
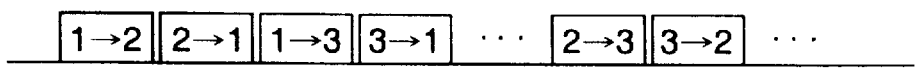
Figure 3:
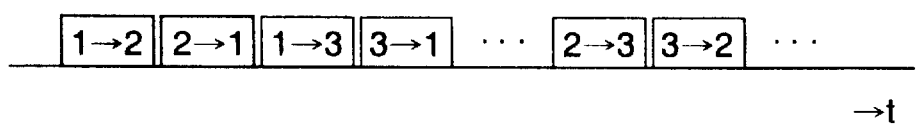

For example, a band allocation of conventional FDMA becomes as shown in FIG. 3 at (1) where a notation 1→2 or the like means communications from a station 1 at a site 1 to a station 2 at a site 2. In contrast, the bandwidth of this invention is halved as shown in FIG. 4.

Figure 4:
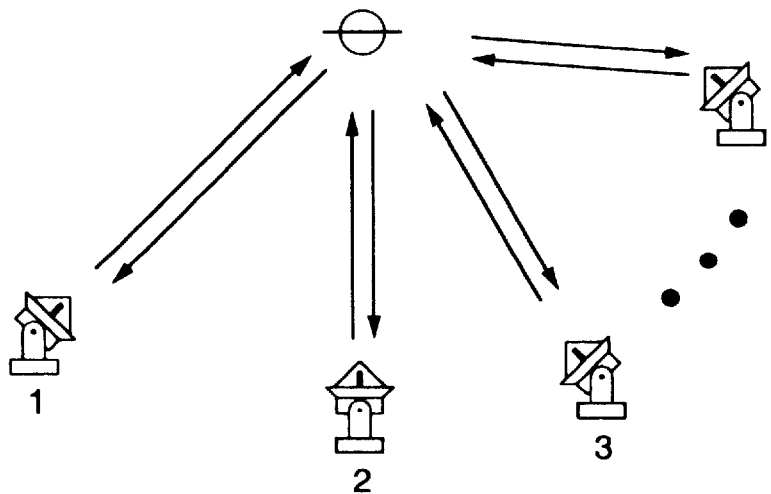
FIG. 4 is a diagram illustrating multi-site communications.
Figure 4:
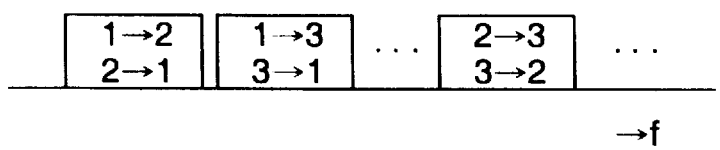

Also as compared to conventional TDMA communications shown in FIG. 3 at (2), the communications of this invention illustrated in FIG. 4 can efficiently use the band in total.

A frequency deviation at the satellite transponder can be obtained by comparing a carrier of an original signal transmitted from a local station with a carrier which is reproduced from the local transmission signal contained in its reception signal so that a local transmission signal cancelling circuit can generate a signal for cancelling the local transmission signal. The reliability of the whole system can be improved by controlling the frequency of the original signal at a local station in accordance with the frequency deviation at the satellite transponder, and setting the precise and stable frequency of the reception signal at the local station.

Figure 5:
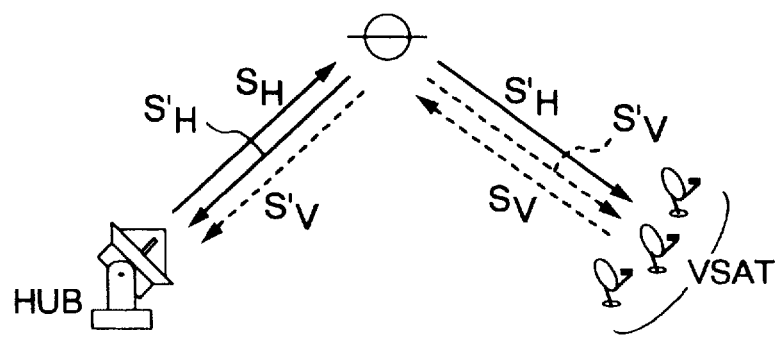
FIG. 5 is a diagram illustrating a very small aperture terminal (VSAT) system.

FIG. 5 illustrates an application of this invention to a very small aperture terminal (VSAT) system. The VSAT system includes a HUB station having a large antenna and a high power amplifier, and a number of very small aperture terminals (VSATs). A signal $S_H$ from the HUB station has a high power, whereas a signal $S_V$ from each VSAT has a low power. The HUB station can receive easily a signal $S'_V$ from each VSAT via the satellite through cancellation of the local transmission signal (satellite return signal) $S'_H$ even if the signal has the same frequency band as the signal $S_H$. On the other hand, each VSAT can receive the signal $S'_H$ from the HUB station without the signal cancelling circuit because the signal $S'_H$ is large. Although both the large signal $S'_H$ from the HUB station and the small signal $S'_V$ from VSAT are received at VSAT, the signal from the HUB station can be stably received by inserting a proper non-linear circuit (such as an amplifier) at VSAT and positively using the performance of the non-linear circuit which has a small signal suppression effect with respect to a large signal.

As above, a satellite communications earth station is provided with a function of cancelling local transmission signal components contained in its reception signal. Accordingly, a VSAT system using the same frequency band can be realized and frequency resources can be economized considerably.

In order to facilitate equalization of amplitude/delay on the satellite return path, correction of a delay time including satellite drifts, reproduction of a carrier for cancelling the local transmission signal, and the like, it is effective to perform a pre-adjustment before the system start-up at each station. Addition of such functions is preferable.

If a power of a satellite transponder is limited as discussed previously, a power of radio waves received at an earth station from the satellite is small. In order to maintain a quality of communications similar to conventional communications, a large reception antenna is used. For example, in the case of lowering the power at the satellite repeater by 3 dB at the maximum, the diameter of the antenna is increased by about 1.4 times.

As compared to conventional satellite communications, the frequency band can be used more efficiently because according to the invention, the increased number of communications channels can be accommodated in a limited frequency band.

Applying this invention to a satellite communications system for two-site bidirectional communications can economize the frequency band.

The invention is also applicable to a multi-site satellite communications system, with economized frequency band.

The invention is also applicable to a VSAT system, with economized frequency band and stabilized system.

In two-site bidirectional communications, in order to demodulate one of superposed two signals of two stations, a signal (interference signal) different from a signal to be demodulated from a reception signal is required to be cancelled. In this case, only a station transmitting the interference signal and having interference signal information can demodulate, and stations other than the two stations in communications cannot demodulate, so that a privacy function can be obtained.

Detailed embodiments of the invention will be described with reference to the accompanying drawings.

Figure 6:
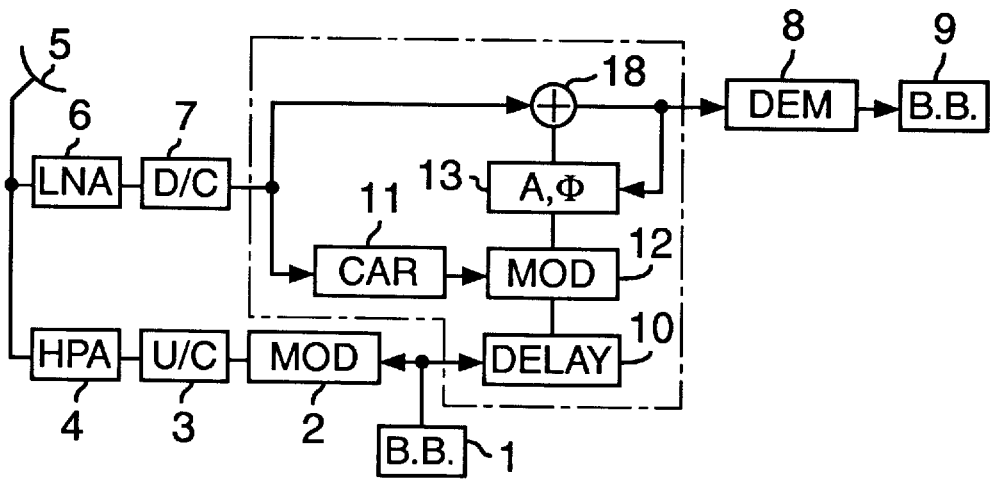
FIG. 6 is a block diagram showing the structure of an embodiment of the present invention.

FIG. 6 is a block diagram showing the structure of an embodiment of the invention.

First, a transmission system will be described. Referring to FIG. 6, reference numeral 1 represents a local transmission baseband circuit, reference numeral 2 represents a local transmission modulator, reference numeral 3 represents a frequency converter (up-converter), reference numeral 4 represents a high power amplifier, and reference numeral 5 represents an antenna. The local transmission baseband circuit 1 digitizes transmission information such as audio, video, and data, and error-correction encodes it for the correction of any error generated on a transmission channel to generate a transmission bit train which is inputted to the local transmission modulator 2. In order to convert the transmission bit train into a modulated wave suitable for the transmission channel, the local transmission modulator 2 modulates a carrier outputted from an oscillator at the local station with the transmission bit train to obtain a modulated transmission wave which is inputted to the up-converter 3. The up-converter converts the frequency of the modulated transmission wave into a frequency (RF frequency) suitable for the transmission of radio waves toward the satellite. For example, this frequency is a 14 GHz band for Ku band and a 6 GHz band for C band. The modulated and frequency-converted transmission wave is inputted to the high power amplifier 4 which amplifies the wave to have a power necessary for the transmission. The amplified signal is inputted to the antenna 5 from which radio waves are transmitted toward the satellite. The constituents 1 to 5 are similar to those of a transmission system of a conventional satellite communications earth station, and the detailed description thereof is omitted.

Next, a reception system will be described. Reference numeral 6 represents a low noise amplifier, reference numeral 7 represents a frequency converter (down-converter), reference numeral 8 represents a remote transmission signal demodulator, and reference numeral 9 represents a remote transmission signal baseband circuit. A signal transmitted from an earth station is frequency-converted by the satellite transponder into a frequency different from the frequency of the transmitted signal, and the radio wave $(S'_V + S'_H)$ is transmitted toward the antenna 5. For example, the converted frequency is a 12 GHz band for Ku band and a 4 GHz band for C band. A weak signal received from the satellite by the antenna 5 is inputted to the low noise amplifier 6 to amplify it. The signal amplified by the low noise amplifier 6 is inputted to the down-converter 7 which converts the frequency of the signal amplified by the low noise amplifier 6 into a frequency (IF frequency) suitable for signal processing such as demodulation. The frequency-converted signal is inputted to the remote transmission signal demodulator 8 which demodulates the modulated wave of the IF frequency and converts it into a reception bit train. The reception bit train is inputted to the remote transmission signal baseband circuit 9 which performs an error-correction process and the like to obtain transmission information transmitted from the remote station. The constituents 5 to 9 are similar to those of a transmission system of a conventional satellite communications earth station, and the detailed description thereof is omitted.

In this embodiment, in order to realize the function of cancelling a local transmission signal, constituents 10, 11, 12, 13, and 18 are added to the above-described conventional system. Reference numeral 10 represents a delay (memory) circuit for local transmission wave cancelling signal generation, reference numeral 11 represents a carrier reproducing circuit, reference numeral 12 represents a modulator for local transmission wave cancelling signal generation, reference numeral 13 represents an amplitude/phase control circuit for local transmission wave cancelling signal generation, and reference numeral 18 represents an adder.

The transmission bit train (an output from the baseband circuit 1) used at the transmission system for modulation is also inputted to the delay (memory) circuit 10. The delay (memory) circuit 10 stores the transmission bit train in order to delay it by a time required for the transmission wave $S_H$ to transmit from the earth station to the satellite and reach the earth station via the satellite transponder as the local transmission wave $S'_H$, and inputs the transmission bit train delayed by a necessary time to the modulator 12. The signal $(S'_V + S'_H)$ converted into the IF frequency by the frequency converter 7 of the reception system is also distributed to the carrier reproducing circuit 11. The carrier reproducing circuit 11 reproduces the carrier $(S'_H)$ of the local transmission wave components contained in the reception signal of the IF frequency, and inputs it to the modulator 12. The modulator 12 modulates like in the transmission system the carrier $(S'_H)$ inputted from the carrier reproducing circuit 11 with the transmission bit train $(S'_H)$ inputted from the delay (memory) circuit 10 to thereby generate a modulated wave for local transmission wave cancelling signal generation which is inputted to the amplitude/phase control circuit 13. The amplitude/phase control circuit 13 controls the amplitude and phase of the modulated wave for local transmission wave cancelling signal generation to make the modulated wave have the same amplitude as, and the opposite phase to, those of the local transmission signal components $(S'_H)$ contained in the reception signal (a signal from the down-converter 7 to the adder 18). The local transmission wave cancelling signal $(-S'_H)$ with the adjusted amplitude and phase is inputted to the adder 18 which adds the signal $(S'_V + S'_H)$ from the down-converter 7 to the signal $(-S'_H)$ from the amplitude/phase control circuit 13. Addition by the adder 18 suppresses the local transmission signal components contained in the reception signal by the cancelling effects and can divide the remote transmission signal components. Therefore, the remote transmission signal demodulator 8 and remote transmission signal baseband circuit 9 at the later stages can operate normally.

The above-described arrangement adds a function of cancelling the local transmission signal components to a conventional satellite communication earth station.

Figure 7:
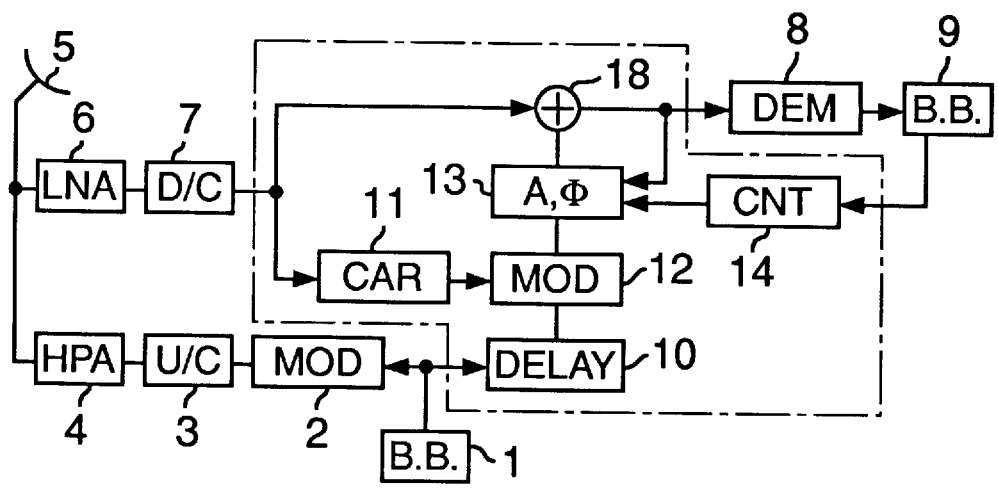
FIG. 7 is a block diagram showing the structure of another embodiment of the present invention.

FIG. 7 is a block diagram showing the structure of another embodiment of the invention. In this embodiment, a remote transmission signal is demodulated and error-corrected and the degree of error correction is fed back to the remote station to reduce errors.

First, a transmission system will be described. Referring to FIG. 7, reference numeral 1 represents a local transmission baseband circuit, reference numeral 2 represents a local transmission modulator, reference numeral 3 represents a frequency converter (up-converter), reference numeral 4 represents a high power amplifier, and reference numeral 5 represents an antenna. The local transmission baseband circuit 1 digitizes transmission information such as audio, video, and data, and error-correction encodes it for the correction of any error generated on a transmission channel to generate a transmission bit train which is inputted to the local transmission modulator 2. In order to convert the transmission bit train into a modulated wave suitable for the transmission channel, the local transmission modulator 2 modulates a carrier outputted from an oscillator at the local station with the transmission bit train to obtain a modulated transmission wave which is inputted to the up-converter 3. The up-converter converts the frequency of the modulated transmission wave into an RF frequency suitable for the transmission of radio waves toward the satellite. The modulated and frequency-converted transmission wave is inputted to the high power amplifier 4 which amplifies the wave to have a power necessary for the transmission. The amplified signal is inputted to the antenna 5 from which radio waves are transmitted toward the satellite. The constituents 1 to 5 are similar to those of a transmission system of a conventional satellite communications earth station.

Next, a reception system will be described. Reference numeral 6 represents a low noise amplifier, reference numeral 7 represents a frequency converter (down-converter), reference numeral 8 represents a remote transmission signal demodulator, and reference numeral 9 represents a remote transmission signal baseband circuit. A signal transmitted from an earth station is frequency-converted by the satellite transponder into a frequency different from the frequency of the transmitted signal, and the radio wave is transmitted toward the antenna 5. A weak signal received from the satellite by the antenna 5 is inputted to the low noise amplifier 6 to amplify it. The signal amplified by the low noise amplifier 6 is inputted to the down-converter 7 which converts the frequency of the signal amplified by the low noise amplifier 6 into an IF frequency suitable for signal processing such as demodulation. The frequency-converted signal is inputted to the remote transmission signal demodulator 8 which demodulates the modulated wave of the IF frequency and converts it into a reception bit train. The reception bit train is inputted to the remote transmission signal baseband circuit 9 which performs an error-correction process and the like to obtain transmission information transmitted from the remote station. The constituents 5 to 9 are similar to those of a transmission system of a conventional satellite communications earth station.

In this embodiment, in order to realize the function of cancelling a local transmission signal, constituents 10, 11, 12, 13, 14 and 18 are added to the above-described conventional system. Reference numeral 10 represents a delay (memory) circuit for local transmission wave cancelling signal generation, reference numeral 11 represents a carrier reproducing circuit, reference numeral 12 represents a modulator for local transmission wave cancelling signal generation, reference numeral 13 represents an amplitude/phase control circuit for local transmission wave cancelling signal generation, reference numeral 14 represents a controller, and reference numeral 18 represents an adder.

The transmission bit train (an output from the baseband circuit 1) used at the transmission system for modulation is also inputted to the delay (memory) circuit 10. The delay (memory) circuit 10 stores the transmission bit train in order to delay it by a time required for the transmission wave to transmit from the earth station to the satellite and reach the earth station via the satellite repeater as the local transmission wave, and inputs the transmission bit train delayed by a necessary time to the modulator 12. The signal converted into the IF frequency by the frequency converter 7 of the reception system is also distributed to the carrier reproducing circuit 11. The carrier reproducing circuit 11 reproduces the carrier of the local transmission wave components contained in the reception signal of the IF frequency, and inputs it to the modulator 12. The modulator 12 modulates like in the transmission system the carrier inputted from the carrier reproducing circuit 11 with the transmission bit train inputted from the delay (memory) circuit 10 to thereby generate a modulated wave for local transmission wave cancelling signal generation which is inputted to the amplitude/phase control circuit 13. The amplitude/phase control circuit 13 controls the amplitude and phase of the modulated wave for local transmission wave cancelling signal generation to make the modulated wave have the same amplitude as, and the opposite phase to, those of the local transmission signal components contained in the reception signal (a signal from the down-converter 7 to the adder 18). The local transmission wave cancelling signal with the adjusted amplitude and phase is inputted to the adder 18. The bit error rate obtained through error-correction by the remote transmission signal baseband circuit 9 is supplied to the controller 14. If the bit error rate increases, it is judged that the local transmission signal cancelling is not sufficient. In this case, the controller 14 controls the amplitude/phase control circuit 13 to change the amplitude and phase of the signal modulated by the modulator 12 and minimize the bit error rate. The adder 18 adds the signal from the down-converter 7 to the signal from the amplitude/phase control circuit 13. Addition by the adder 18 suppresses the local transmission signal components contained in the reception signal by the cancelling effects and can separate the remote transmission signal components. Therefore, the remote transmission signal demodulator 8 and remote transmission signal baseband circuit 9 at the later stages can operate normally.

The above-described arrangement adds a function of cancelling the local transmission signal components to a conventional satellite communication earth station, and also adds a function of feeding back code error information of the received remote transmission signal to the amplitude/phase control unit for local transmission signal components cancelling in order to judge the cancelling effects.

Figure 8:
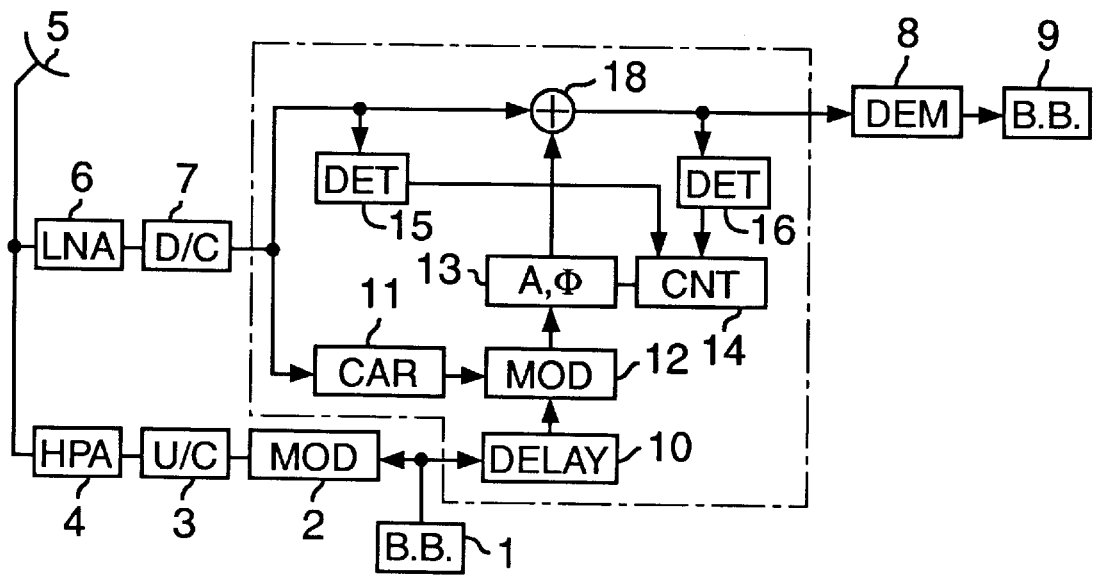
FIG. 8 is a block diagram showing the structure of a further embodiment of the present invention.

FIG. 8 is a block diagram showing the structure of a further embodiment of the invention. In this embodiment, a signal level difference between signals before and after a local transmission signal component cancelling circuit is used to control the cancelling circuit, by detecting local transmission signal components left uncancelled in the reception signal.

First, a transmission system will be described. Referring to FIG. 8, reference numeral 1 represents a local transmission baseband circuit, reference numeral 2 represents a local transmission modulator, reference numeral 3 represents a frequency converter (up-converter), reference numeral 4 represents a high power amplifier, and reference numeral 5 represents an antenna. The local transmission baseband circuit 1 digitizes transmission information such as audio, video, and data, and error-correction encodes it for the correction of any error generated on a transmission channel to generate a transmission bit train which is inputted to the local transmission modulator 2. In order to convert the transmission bit train into a modulated wave suitable for the transmission channel, the local transmission modulator 2 modulates a carrier outputted from an oscillator at the local station with the transmission bit train to obtain a modulated transmission wave which is inputted to the up-converter 3. The up-converter converts the frequency of the modulated transmission wave into an RF frequency suitable for the transmission of radio waves toward the satellite. The modulated and frequency-converted transmission wave is inputted to the high power amplifier 4 which amplifies the wave to have a power necessary for the transmission. The amplified signal is inputted to the antenna 5 from which radio waves are transmitted toward the satellite. The constituents 1 to 5 are similar to those of a transmission system of a conventional satellite communications earth station.

Next, a reception system will be described. Reference numeral 6 represents a low noise amplifier, reference numeral 7 represents a frequency converter (down-converter), reference numeral 8 represents a remote transmission signal demodulator, and reference numeral 9 represents a remote transmission signal baseband circuit. A signal transmitted from an earth station is frequency-converted by the satellite transponder into a frequency different from the frequency of the transmitted signal, and the radio wave is transmitted toward the antenna 5. A weak signal received from the satellite by the antenna 5 is inputted to the low noise amplifier 6 to amplify it. The signal amplified by the low noise amplifier 6 is inputted to the down-converter 7 which converts the frequency of the signal amplified by the low noise amplifier 6 into an IF frequency suitable for signal processing such as demodulation. The frequency-converted signal is inputted to the remote transmission signal demodulator 8 which demodulates the modulated wave of the IF frequency and converts it into a reception bit train. The reception bit train is inputted to the remote transmission signal baseband circuit 9 which performs an error-correction process and the like to obtain transmission information transmitted from the remote station. The constituents 5 to 9 are similar to those of a transmission system of a conventional satellite communications earth station.

In this embodiment, in order to realize the function of cancelling a local transmission signal, constituents 10, 11, 12, 13, 14, 15, 16 and 18 are added to the above-described conventional system. Reference numeral 10 represents a delay (memory) circuit for local transmission wave cancelling signal generation, reference numeral 11 represents a carrier reproducing circuit, reference numeral 12 represents a modulator for local transmission wave cancelling signal generation, reference numeral 13 represents an amplitude/phase control circuit for local transmission wave cancelling signal generation, reference numeral 14 represents a controller, reference numerals 15 and 16 represent power detecting circuits, and reference numeral 18 represents an adder.

The transmission bit train (an output from the baseband circuit 1) used at the transmission system for modulation is also inputted to the delay (memory) circuit 10. The delay (memory) circuit 10 stores the transmission bit train in order to delay it by a time required for the transmission wave to transmit from the earth station to the satellite and reach the earth station via the satellite transponder as the local transmission wave, and inputs the transmission bit train delayed by a necessary time to the modulator 12. The signal converted into the IF frequency by the frequency converter 7 of the reception system is also distributed to the carrier reproducing circuit 11. The carrier reproducing circuit 11 reproduces the carrier of the local transmission wave components contained in the reception signal of the IF frequency, and inputs it to the modulator 12. The modulator 12 modulates like in the transmission system the carrier inputted from the carrier reproducing circuit 11 with the transmission bit train inputted from the delay (memory) circuit 10 to thereby generate a modulated wave for local transmission wave cancelling signal generation which is inputted to the amplitude/phase control circuit 13. The amplitude/phase control circuit 13 controls the amplitude and phase of the modulated wave for local transmission wave cancelling signal generation to make the modulated wave have the same amplitude as, and the opposite phase to, those of the local transmission signal components contained in the reception signal (a signal from the down-converter 7 to the adder 18). The local transmission wave cancelling signal with the adjusted amplitude and phase is inputted to the adder 18. Power information of signals before and after the addition for local transmission signal cancelling is supplied to the controller 14. The controller 14 controls the amplitude/phase control circuit 13 to change the amplitude and phase in order to maximize a difference between powers before and after the addition, excepting the attenuation amount in the adder 18 itself. For example, this power difference is about 3 dB at the maximum in two-site communications, and several dB to several tens dB in the case of a HUB station of a VSAT system. The power detecting circuit 15 detects a signal level before the addition and supplies it to the controller 14, whereas the power detecting circuit 16 detects a signal level after the addition and supplies it to the controller 14. The power detection circuits 15 and 16 are not necessary in some cases by using an AGC control value if an AGC circuit is used in the IF frequency band. The adder 18 adds the signal from the down-converter 7 to the signal from the amplitude/phase control circuit 13. Addition by the adder 18 suppresses the local transmission signal components contained in the reception signal by the cancelling effects and can divide the remote transmission signal components. Therefore, the remote transmission signal demodulator 8 and remote transmission signal baseband circuit 9 at the later stages can operate normally.

The above-described arrangement adds a function of cancelling the local transmission signal components to a conventional satellite communication earth station. The signal level difference between signals before and after a local transmission signal component cancelling circuit is used to control the cancelling circuit, by detecting local transmission signal components left uncancelled in the reception signal.

Figure 9:
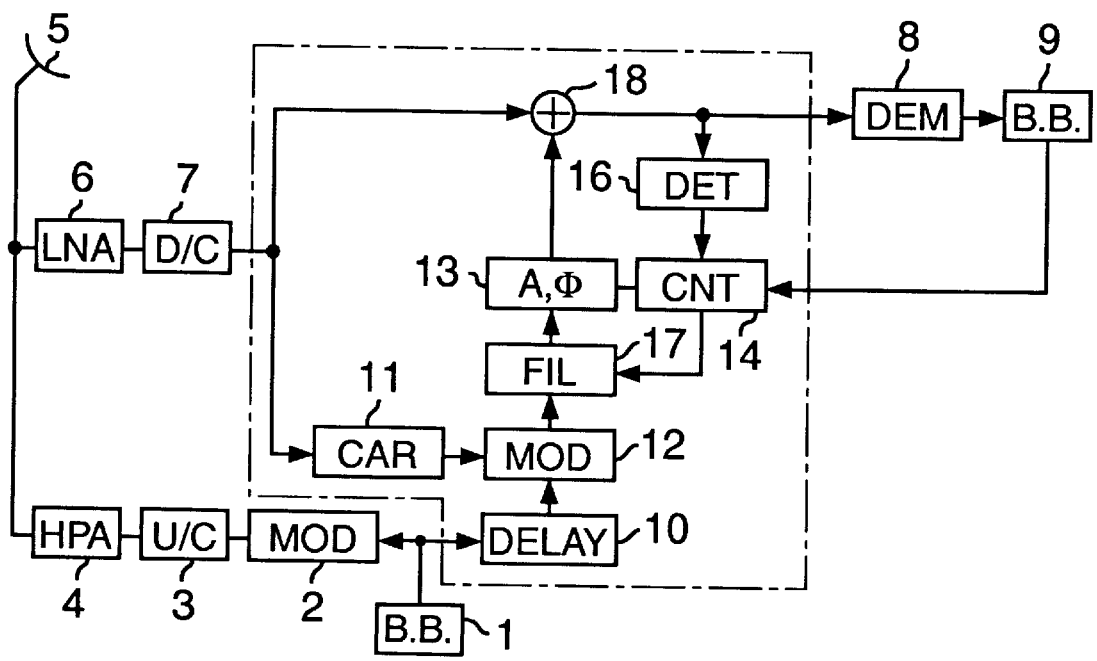
FIG. 9 is a block diagram showing the structure of a still further embodiment of the present invention.

FIG. 9 is a block diagram showing the structure of a still further embodiment of the invention. This embodiment is provided with a training function for improving the local transmission signal component cancelling effects by compensating for transmission channel distortions. The cancelling signal is generated after the distortion characteristics of a satellite return transmission path including a satellite transponder and local transmission/reception RF systems are equalized. Specifically, before the start of communications, each partner earth station transmits a signal and receives a local transmission signal or satellite return signal. During this period, an adaptive filter through which a cancelling signal passes is subject to learning of optimization of the filter coefficients and maximization of the cancelling effects. With this operation at each partner earth station prior to actual communications, the cancelling can be performed more sufficiently and the bit error rate can be improved.

First, a transmission system will be described. Referring to FIG. 9, reference numeral 1 represents a local transmission baseband circuit, reference numeral 2 represents a local transmission modulator, reference numeral 3 represents a frequency converter (up-converter), reference numeral 4 represents a high power amplifier, and reference numeral 5 represents an antenna. The local transmission baseband circuit 1 digitizes transmission information such as audio, video, and data, and error-correction encodes it for the correction of any error generated on a transmission channel to generate a transmission bit train which is inputted to the local transmission modulator 2. In order to convert the transmission bit train into a modulated wave suitable for the transmission channel, the local transmission modulator 2 modulates a carrier outputted from an oscillator at the local station with the transmission bit train to obtain a modulated transmission wave which is inputted to the up-converter 3. The up-converter converts the frequency of the modulated transmission wave into an RF frequency suitable for the transmission of radio waves toward the satellite. The modulated and frequency-converted transmission wave is inputted to the high power amplifier 4 which amplifies the wave to have a power necessary for the transmission. The amplified signal is inputted to the antenna 5 from which radio waves are transmitted toward the satellite. The constituents 1 to 5 are similar to those of a transmission system of a conventional satellite communications earth station.

Next, a reception system will be described. Reference numeral 6 represents a low noise amplifier, reference numeral 7 represents a frequency converter (down-converter), reference numeral 8 represents a remote transmission signal demodulator, and reference numeral 9 represents a remote transmission signal baseband circuit. A signal transmitted from an earth station is frequency-converted by the satellite transponder into a frequency different from the frequency of the transmitted signal, and the radio wave is transmitted toward the antenna 5. A weak signal received from the satellite by the antenna 5 is inputted to the low noise amplifier 6 to amplify it. The signal amplified by the low noise amplifier 6 is inputted to the down-converter 7 which converts the frequency of the signal amplified by the low noise amplifier 6 into an IF frequency suitable for signal processing such as demodulation. The frequency-converted signal is inputted to the remote transmission signal demodulator 8 which demodulates the modulated wave of the IF frequency and converts it into a reception bit train. The reception bit train is inputted to the remote transmission signal baseband circuit 9 which performs an error-correction process and the like to obtain transmission information transmitted from the remote station. The constituents 5 to 9 are similar to those of a transmission system of a conventional satellite communications earth station.

In this embodiment, in order to realize the function of cancelling a local transmission signal, constituents 10, 11, 12, 13, 14, 16, 17 and 18 are added to the above-described conventional system. Reference numeral 10 represents a delay (memory) circuit for local transmission wave cancelling signal generation, reference numeral 11 represents a carrier reproducing circuit, reference numeral 12 represents a modulator for local transmission wave cancelling signal generation, reference numeral 13 represents an amplitude/phase control circuit for local transmission wave cancelling signal generation, reference numeral 14 represents a controller, reference numeral 17 represents an adaptive filter, and reference numeral 18 represents an adder.

The transmission bit train (an output from the baseband circuit 1) used at the transmission system for modulation is also inputted to the delay (memory) circuit 10. The delay (memory) circuit 10 stores the transmission bit train in order to delay it by a time required for the transmission wave to transmit from the earth station to the satellite and reach the earth station via the satellite transponder as the local transmission wave, and inputs the transmission bit train delayed by a necessary time to the modulator 12. The signal converted into the IF frequency by the frequency converter 7 of the reception system is also distributed to the carrier reproducing circuit 11. The carrier reproducing circuit 11 reproduces the carrier of the local transmission wave components contained in the reception signal of the IF frequency, and inputs it to the modulator 12. The modulator 12 modulates like in the transmission system the carrier inputted from the carrier reproducing circuit 11 with the transmission bit train inputted from the delay (memory) circuit 10 to thereby generate a modulated wave for local transmission wave cancelling signal generation which is inputted to the adaptive filter 17. The adaptive filter 17 is used for enhancing the cancelling effects, by adding the same distortion as that generated on the satellite return path to the local transmission signal cancelling signal to make this signal have the same waveform as the local transmission signal. Under the control of the controller 14, the adaptive filter 17 changes its filter characteristics to maximize the local transmission signal cancelling effects. Optimization of the filter characteristics of the adaptive filter 17 can be made more complete by receiving only the local transmission signal at each partner earth station before the start of bidirectional communications. An output of the adaptive filter 17 is inputted to the amplitude/phase control circuit 13. The amplitude/phase control circuit 13 controls the amplitude and phase of the modulated wave for local transmission wave cancelling signal generation to make the modulated wave have the same amplitude as, and the opposite phase to, those of the local transmission signal components contained in the reception signal (a signal from the down-converter 7 to the adder 18). The local transmission wave cancelling signal with the adjusted amplitude and phase is inputted to the adder 18. The controller 14 is supplied with the signal after the addition and the error correction information from the baseband circuit 9. The controller 14 controls the amplitude/phase circuit 13 and adaptive filter 17. The adder 18 adds the signal from the down-converter 7 to the signal from the amplitude/phase control circuit 13. Addition by the adder 18 suppresses the local transmission signal components contained in the reception signal by the cancelling effects and can separate the remote transmission signal components. Therefore, the remote transmission signal demodulator 8 and remote transmission signal baseband circuit 9 at the later stages can operate normally.

The above-described arrangement adds a function of cancelling the local transmission signal components to a conventional satellite communication earth station, and also provides the training function for improving the local transmission signal component cancelling effects by compensating for transmission channel distortions.

Figure 10:
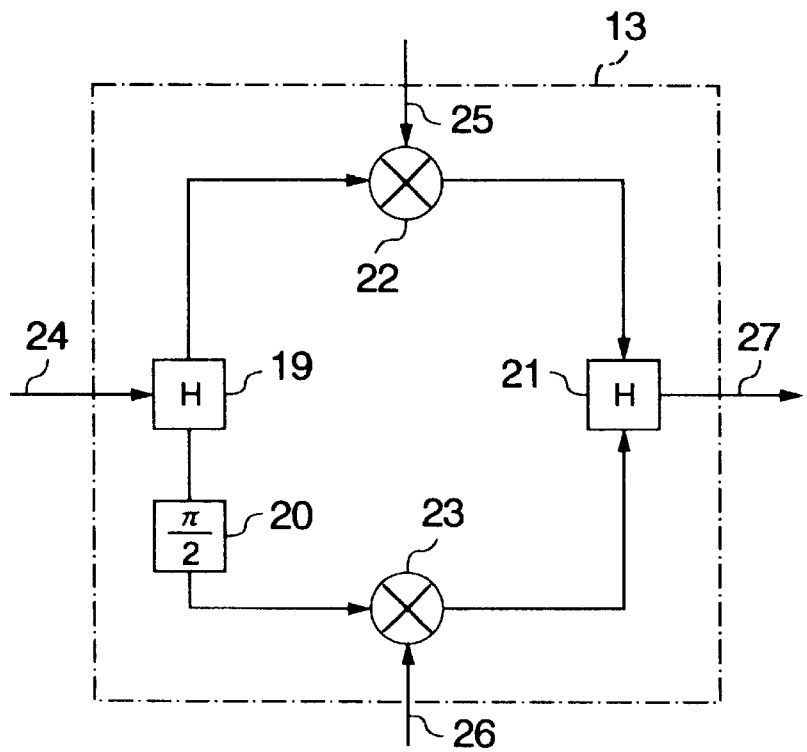
FIG. 10 is a diagram showing an example of a phase control circuit used by the embodiments of the present invention.
Figure 11:
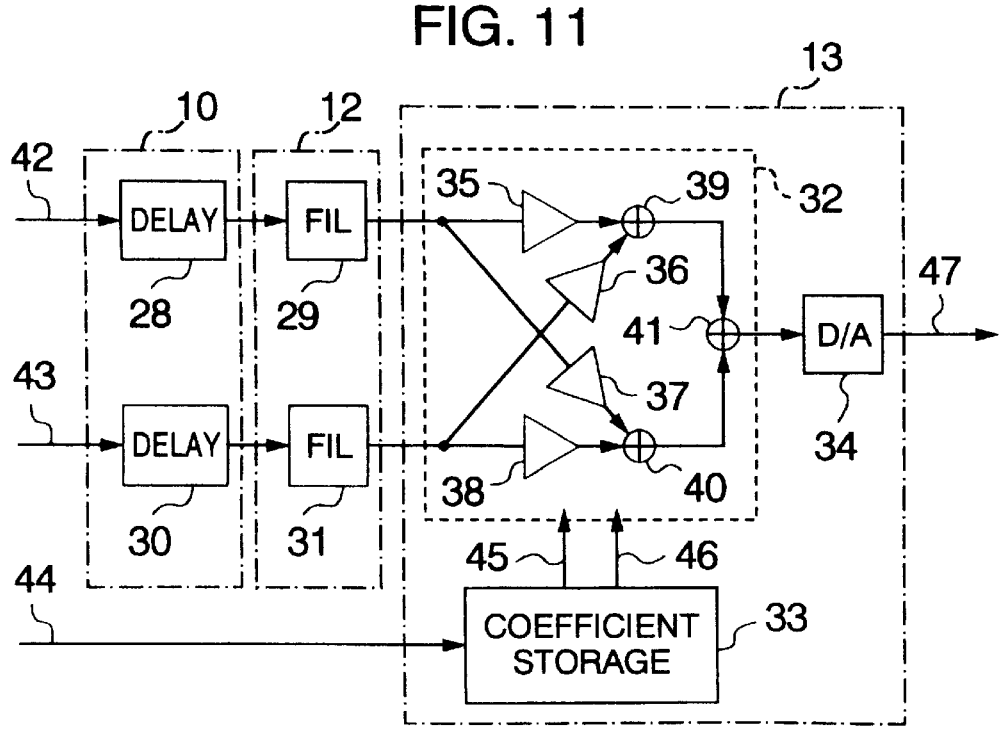
FIG. 11 is a diagram showing another example of a phase control circuit used by the embodiments of the present invention.
Figure 12:
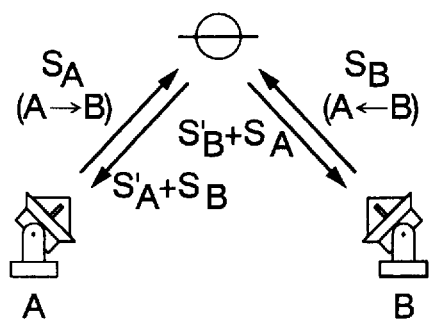
FIG. 12 is a diagram illustrating the concepts of conventional technology.
Figure 12:
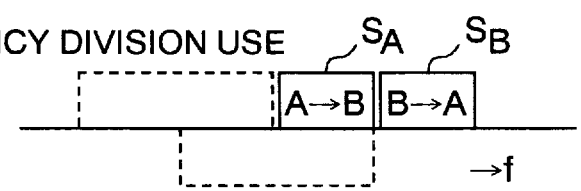
Figure 12:
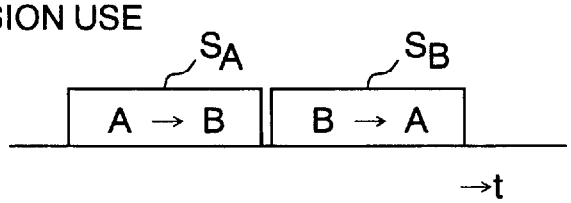

FIGS. 10 and 11 show examples of a phase control circuit to be used by the embodiments of the invention. It is necessary for the invention to control the amplitude and phase of the local transmission signal cancelling signal. The amplitude can be easily controlled by using a normal variable attenuator or variable amplifier. The phase may be controlled by using an IF frequency. If the modulator for local transmission signal cancelling signal generation is made of a digital modulator, the phase can be controlled through digital calculations. FIG. 10 shows a phase control circuit using an IF frequency, and FIG. 11 shows a phase control circuit using digital calculations.

The circuit shown in FIG. 10 will be described. A calculation of rotating the phase of a signal S(t) by θ is given by the following equation (6):

$$S_T(t) \exp(j\theta) = S(t) \cos\theta + S(t)j \sin\theta \quad (6)$$

The circuit shown in FIG. 10 calculates this equation. The input signal S(t) 24 is distributed by a distributor 19. A 90° phase shifter 20 represents j in the second term of the equation (6). An output of a multiplier 22 with a multiplier signal (cosθ) 25 represents the first term of the equation (6). An output of a multiplier 23 with a multiplier signal (sinθ) 26 represents the second term of the equation (6). An adder 21 adds the first and second terms to obtain an output signal $S_T(t)\exp(j\theta)$ 27.

Next, the circuit shown in FIG. 11 will be described. Two input signals (I) and (Q) 42 and 43 are supplied to the modulator. The input signal 42 is delayed by a delay circuit 28 and thereafter its waveform is shaped by a digital filter 29 which outputs a signal I(t). Similarly, the input signal 43 is delayed by a delay circuit 30 and thereafter its waveform is shaped by a digital filter 31 which outputs a signal Q(t). An output of a phase rotation calculation circuit 32 is converted into an analog signal by a D/A converter 34 and outputted as a signal 47. A phase control input (θ) 44 is converted by a coefficient storage circuit 33 into multiplier coefficients (cosθ) and (sinθ) 45 and 46. The operation of the phase rotation calculation circuit 32 will be detailed. An input signal S(t) to the phase rotation calculation circuit 32 is given by the following equation (7):

$$S_T(t) = I(t) + jQ(t) \quad (7)$$

The calculation of rotating the phase of the signal S(t) by θ can be given by the following equation (8):

$$\begin{aligned}
S_T(t)\exp(j\theta) &= (I(t) + jQ(t))(\cos\theta + j\sin\theta) \\
&= (I(t)\cos\theta - Q(t)j\sin\theta) + \\
&\quad j(I(t)\sin\theta + Q(t)\cos\theta)
\end{aligned}$$

The phase rotation calculation circuit 32 shown in FIG. 11 calculates the equation (8). The outputs of coefficient multipliers 35 to 38 represent the first to fourth terms of the equation (8), respectively. These outputs are added together by adders 39, 40, and 41 to obtain $S_T(t)\exp(j\theta)$. The phase rotation calculation circuit is configured as described above.

As described so far, according to the present invention, since the occupied bandwidth can be halved at the maximum as compared to conventional communications, the running cost (use charge of a satellite transponder) can be reduced considerably, contributing to an efficient usage of valuable frequency resources.

An apparatus which realizes the invention can be made of a simple circuit added to a conventional satellite communications apparatus. Accordingly, the running cost (use charge of a satellite repeater) can be reduced considerably.

In a VSAT system of an embodiment of the invention, a frequency deviation at a satellite repeater can be known from the frequency of a carrier of a received local transmission signal. It is therefore possible to control the frequency of the local transmission signal at a HUB station and compensate for the frequency deviation. In this case, each VSAT station can stabilize the reception frequency, improving the stabilization of the whole system.

The invention is particularly effective for high speed two-site bidirectional communications requiring broad frequency bandwidths.

Cancellation can not be executed if each station in two-site bidirectional communications has no local transmission information. Accordingly, each station is provided with a privacy function.

What is claimed is:

1. A satellite communications system capable of bidirectional satellite communications between earth stations via a satellite, each earth station comprising:

a transmission unit for transmitting a local transmission signal toward the satellite;

a reception unit for receiving a remote transmission signal transmitted from a remote earth station and a return signal, the return signal being part of said local transmission signal transmitted from the local earth station toward the satellite and partially returned from the satellite and received at the local earth station; and a cancelling unit supplied with part of said local transmission signal and said received return signal, for cancelling said received return signal by part of said local transmission signal, whereby communications by a plurality of signals sharing the same frequency band become possible while at least partially superposing respective signal frequencies.

2. A satellite communication system according to claim 1, wherein said cancelling unit comprises:

a delay circuit separating part of said local transmission signal and delaying said separated signal by a transmission time required for said return signal to reach the local earth station after said local transmission signal is transmitted toward the satellite;

a circuit reproducing a carrier from said return signal;

a modulator circuit modulating said reproduced carrier with said delayed, separated signal and outputting a modulated wave for cancelling said received return signal;

an amplitude/phase control circuit controlling the amplitude and phase of said modulated wave outputted from said modulator circuit; and a combining circuit combining said modulated wave with the phase and amplitude having been controlled by said amplitude/phase control circuit, and a signal transmitted from the remote earth station including said return signal, whereby said received return signal contained in the signal transmitted from the remote earth station is cancelled through combining.

3. A satellite communications system according to claim 2, wherein said modulator circuit is provided with a function of making said modulated wave for cancelling said received return signal have the same amplitude as, and the opposite phase to, those of said received return signal.

4. A satellite communications system according to claim 2, wherein said cancelling unit further comprises:

an error correction circuit provided on the output side of said combining circuit and correcting an error in an output signal of said combining circuit; and a control circuit receiving a bit error rate obtained through error correction by said error correction circuit, and if the bit error rate increases, controlling said amplitude/phase control circuit to control the amplitude and phase of the carrier wave of said modulated wave so as to minimize the bit error rate.

5. A satellite communications system according to claim 2, wherein said delay circuit is a buffer memory for controlling the read/write timing in accordance with the transmission time.

6. A satellite communications system according to claim 2, wherein said cancelling unit further comprises:

a level detecting unit for detecting one or both of the signal levels at the front and back stages of said combining circuit; and a control unit for receiving the detected signal level from said level detecting unit and controlling said amplitude/phase control circuit so as to maximize a difference between the detected signal level before and after combining by said combining circuit.

7. A satellite communications system according to claim 6, wherein said cancelling unit further comprises a filter disposed between said modulator circuit and said amplitude/phase control circuit, said filter receiving a control signal from said control unit, giving said modulated wave for cancelling said received return signal, the amplitude/delay frequency characteristics equivalent to distortions of said local transmission signal generated along a satellite return path, and outputting said modulated wave with the changed amplitude/delay characteristics to said amplitude/phase control circuit to maximize the effects of cancelling said received return signal.

8. A satellite communications system according to claim 2, wherein the frequency of the local transmission signal at each earth station is set differently so as to facilitate reproducing the carrier wave at the reproducing circuit.

9. A satellite communications system according to claim 8, wherein at each earth station the frequency of a signal transmitted from a remote earth station is set slightly higher or lower than the frequency of a signal transmitted from a local earth station.

10. A satellite communications system according to claim 1, wherein in response to a channel setting request from two earth stations A and B, a bidirectional satellite channel having a wider band between two bands occupied by communications from station A to station B and from station B to station A is assigned for a predetermined time, allowing the narrower band to share the wider band.

11. A satellite communications system according to claim 1, wherein in response to a channel setting request from two earth stations A and B, a bidirectional satellite channel having a predetermined single band is assigned for a predetermined time, allowing stations A and B to share the band at the same time while superposing part or the whole of frequency spectra.

12. A satellite communication system having N satellite communications earth stations, wherein each of the N earth stations are capable of simultaneous transmission of a local transmission signal, and wherein the respective local transmission signals of a desired pair of bidirectionally communicative earth stations are preassigned a predetermined frequency band, each earth station comprising:

a transmission unit for transmitting a local transmission signal toward a satellite;

a reception unit for receiving a remote transmission signal transmitted from a remote earth station and a return signal, the return signal being part of said local transmission signal transmitted from the local earth station toward the satellite and partially returned from the satellite and received at the local earth station; and a canceling unit supplied with part of said local transmission signal and said received return signal, for canceling said received return signal by part of said local transmission signal, whereby communications by a plurality of signals sharing the same frequency band becomes possible while partially or wholly superposing respective signal frequencies.

13. A VSAT satellite system having a large earth station (HUB station) and a plurality of small earth stations (VSAT stations), the HUB station comprising:

a transmission unit for transmitting a local transmission signal toward the satellite;

a reception unit for receiving a remote transmission signal transmitted from a remote earth station and a return signal, the return signal being part of said local transmission signal transmitted from the local earth station toward the satellite and partially returned from the satellite and received at the local earth station; and a cancelling unit supplied with part of said local transmission signal and said received return signal, for cancelling said received return signal by part of said local transmission signal, whereby communications by the HUB station and the VSAT stations sharing the same frequency band become possible while partially or wholly superposing respective signal frequencies.

14. A VSAT satellite system according to claim 13, wherein said VSAT station comprises:

a transmission unit for transmitting a local transmission signal toward the satellite;

a reception unit for receiving a remote transmission signal transmitted from a remote earth station and a return signal, the return signal being part of said local transmission signal transmitted from the local earth station toward the satellite and partially returned from the satellite and received at the local earth station; and a cancelling unit supplied with part of said local transmission signal and said received return signal, for cancelling said received return signal by part of said local transmission signal, whereby communications by the HUB station and the VSAT stations sharing the same frequency band become possible while partially or wholly superposing respective signal frequencies.

15. A satellite communications system having a plurality of earth stations for bidirectional communication via a satellite transponder, wherein at least one of each pair of earth stations engaged in bidirectional communication comprises:

a transmission system comprising:

local transmission baseband means for digitizing transmission information and error correction coding the digitized transmission information to generate a transmission bit train;

transmission modulating means for modulating said transmission bit train;

up-converter means for converting the frequency of said transmission bit train modulated by said modulating means into an RF frequency;

and transmitting means for transmitting said modulated bit train having the RF frequency as a local transmission signal at a local station toward the satellite transponder via a transmission antenna; and a reception system comprising:

receiving means for receiving via a reception antenna a remote transmission wave transmitted from a remote earth station and frequency band converted and a frequency band converted return signal, the return signal being part of a local transmission signal transmitted from the local earth station toward the satellite transponder and partially returned from the satellite transponder and received at the local earth station;

down-converter means for converting the frequency of a reception signal received by said reception means into an IF frequency;

remote transmission signal demodulating means for demodulating the reception signal having the IF frequency and converting the reception signal into a reception bit train;

remote station transmission signal baseband means for receiving said reception bit train and obtaining transmission information sent from the remoter station; and return signal canceling means for reproducing a carrier wave of the return signal from an output signal of said down-converter means and generating a modulated signal for canceling said frequency band converted signal corresponding to said local transmission signal, said modulated signal being obtained by modulating, in the same manner as said modulating means of said transmission system, said carrier wave with said transmission bit train generated by said local transmission base band means and delayed by a transmission time of said return signal, said return signal canceling means canceling said return signal contained in the output signal of said down-converter means by adding said modulated signal to the output signal.

16. A satellite communications system according to claim 15, wherein said return signal cancelling means comprises:

a carrier wave reproducing unit for reproducing the carrier wave of the return signal from the output signal of said down-converter means;

a delay unit for delaying said transmission bit train generated by said local transmission baseband means by a transmission time of said return signal;

a cancelling signal generation modulating unit for generating a modulated signal for cancelling the return signal, said modulated signal being obtained by modulating, in the same manner as said modulating means of said transmission system, said carrier wave reproduced by said carrier wave reproducing unit with said transmission bit train delayed by said delay unit;

an amplitude/phase control unit for controlling the amplitude and phase of the carrier wave of said cancelling signal generation modulating unit to have the same amplitude as, and the opposite phase to, those of the return signal contained in the reception signal; and an adder unit for adding an output signal of said down-converter means to an output of said amplitude/phase control unit, whereby the return signal contained in the reception signal is suppressed to separate the remote transmission signal components.

17. A satellite communications system according to claim 16, wherein said return signal cancelling means further comprises a control unit for receiving a bit error rate obtained through error correction by said remote transmission signal baseband means, and if the bit error rate increases, controlling said amplitude/phase control unit to control the amplitude and phase of an output of said cancelling signal generation modulating unit so as to minimize the bit error rate.

18. A satellite communications system according to claim 16, wherein said return signal cancelling means further comprises:

level detecting units for detecting levels of signals before and after said adder unit; and a control unit for receiving the levels detected by said level detecting units and controlling said amplitude/phase control unit so as to maximize a difference between the detected signal level before and after addition by said adder unit.

19. A satellite communications system according to claim 18, wherein said return signal cancelling means further comprises a filter disposed among said cancelling signal generation modulating unit, said amplitude/phase control unit, and said control unit, said filter receiving a control signal from said control unit, giving said modulated wave for cancelling said received return signal the amplitude/delay frequency characteristics equivalent to distortions of said local transmission signal generated along a satellite return path, and outputting said modulated wave with the changed amplitude/delay characteristics to said amplitude/phase control unit to maximize the effects of cancelling said received return signal.

20. A satellite communications method for each earth station under bidirectional communication via a satellite transponder, comprising the steps of:

supplying part of a local transmission signal transmitted toward the satellite transponder;

delaying said supplied signal by a time generally equal to a time required for a return signal which is part of said local transmission signal returned from the satellite transponder; and combining said delayed signal and said return signal returned from said satellite transponder and received at the local earth station to cancel said return signal, whereby communications by a plurality of signal sharing the same frequency band become possible while at least partially superposing respective signal frequencies.

21. A satellite communication method for N satellite communications earth stations, wherein each of the N earth stations are capable of simultaneous transmission of a local transmission signal, and wherein the respective local transmission signals of a desired pair of bidirectionally communicative earth stations are preassigned a predetermined frequency band, said method comprising the steps of:

supplying at least part of a local transmission signal transmitted toward a satellite;

delaying said supplied signal by a time generally equal to a transmission time required for a return signal which is part of said local transmission signal returned from the satellite; and combining said delayed signal and said return signal returned from said satellite and received at the local earth station to cancel said return signal, whereby communications by a plurality of signals sharing the same frequency band become possible while partially or wholly superposing respective signal frequencies.

22. A satellite communication method wherein in response to a channel setting request from two earth stations A and B, a bidirectional satellite channel is assigned for predetermined time, the method comprising the steps of: in each of earth stations A and B, supplying part of a local transmission signal transmitted toward a satellite;

delaying said supplied signal by a time generally equal to a transmission time required for a return signal which is part of said local transmission signal returned from the satellite; and combining said delayed signal and said return signal returned from said satellite and received at the local earth station to cancel said return signal, whereby a wider band between two bands occupied by communications from station A to station B and from station B to station A is assigned, allowing the narrower band to share the wider band.

23. A satellite communications method wherein in response to a channel setting request from two earth stations A and B, a bidirectional satellite channel having a predetermined single band is assigned for a predetermined time, the method comprising the steps of: in each of stations A and B, supplying part of a local transmission signal transmitted toward a satellite;

delaying said supplied signal by a time generally equal to a transmission time required for a return signal which is part of said local transmission signal returned from the satellite; and combining said delayed signal and said return signal returned from said satellite and received at the local earth station to cancel said return signal, whereby stations A and B are allowed to share the band at the same time while superposing part of the whole of frequency spectra.

24. A satellite communication method for a VSAT satellite system having a large earth station and a plurality of small earth stations, the method comprising the steps of: in the large HUB earth station, supplying part of a local transmission signal transmitted towards a satellite;

delaying said supplied signal by a time generally equal to a transmission time required for a return signal which is part of said local transmission signal returned from the satellite; and combining said delayed signal and said return signal returned from said satellite and received at the local earth station to cancel said return signal, whereby the same frequency band is shared by both transmission signals from the large HUB earth station and small VSAT earth stations while partially or wholly superposing respective signal frequencies.

25. A satellite communications method according to claim 24, wherein of signals received at each VSAT station, a signal from the HUB station has a much larger power than a signal from each VSAT station, and with said larger power, a reception unit of the VSAT station suppresses the small signal relative to the large signal based on the non-linearity of the reception unit to improve the quality of a signal received from the HUB station.

26. A satellite communications method for a VSAT satellite system having a large earth station and a plurality of small earth stations, the method comprising the steps of: in each small VSAT earth station, supplying part of a local transmission signal transmitted toward a satellite;

delaying said supplied signal by a time generally equal to a transmission time required for a returned signal which is part of said local transmission signal returned from the satellite; and combining said delayed signal and said return signal returned from said satellite and received at the local earth station to cancel said return signal, whereby the same frequency band is shared by both transmission signals from the large HUB earth station and small VSAT earth stations while partially or wholly superposing respective signal frequencies.

27. A satellite communications method for bidirectional communications, comprising the steps of:

supplying part of a local transmission signal transmitted toward a satellite;

delaying said supplied signal by a time generally equal to a transmission time required for a return signal which is part of said local transmission signal returned from the satellite; and combining said delayed signal and said return signal returned from said satellite and received at the local earth station to cancel said return signal, whereby the same frequency band is shared by a plurality of signals while partially or wholly superposing respective signal frequencies.

28. A satellite communications method according to claim 27, wherein in response to a channel setting request, a bidirectional satellite channel is assigned to two stations A and B for a predetermined time, and a wider band between two bands occupied by communications from station A to station B and from station B to station A is assigned, allowing the narrower band to share the wider band.

29. A satellite communications method according to claim 27, wherein in response to a channel setting request, a bidirectional satellite channel of the same single band is assigned to two stations A and B for a predetermined time, and whereby stations A and B share the same single band at the same time while superposing partially or wholly the frequency spectra.

30. For use in a satellite communication system, a return signal canceling circuit which receives a supplied part of a local transmission signal comprising:

a delay circuit for delaying said supplied signal by a transmission time required for a return signal which is part of said local transmission signal returned from a satellite;

a circuit reproducing a carrier wave from the returned signal;

a circuit for modulating said reproduced carrier wave with the signal delayed by said delay circuit;

a circuit changing the amplitude and phase of the modulated carrier wave; and a circuit for combining said modulated wave with the changed amplitude and phase and a reception signal from the satellite.

31. A return signal canceling circuit according to claim 30, wherein said return signal canceling circuit changes the amplitude in accordance with the power level of said reproduced carrier wave.

32. A return signal canceling circuit according to claim 30, wherein said return signal canceling circuit changes the amplitude and phase of said carrier wave and a delay time of said delay circuit in accordance with monitor information of a signal quality of a signal of a remote station outputted from said combining circuit.

33. A return signal canceling circuit according to claim 30, wherein said delay circuit uses a buffer memory for delaying said divided signal by the transmission time for the return signal, and if necessary, controls a retiming of said buffer memory, to thereby compensate for a variation of a delay time caused by drifts of the satellite.

34. A return signal canceling circuit according to claim 30, wherein said return signal canceling circuit has a circuit equivalent to the amplitude/delay frequency characteristics of a satellite return path to improve the canceling degree of the returned signal, said signal being inserted into a signal path for passing a signal divided from said local transmission signal.

35. A signal canceling circuit as in claim 30, further comprising a circuit canceling said return signal in said combined signal.

* * * * *